Dec. 14, 1965 F. A. HELM 3,223,301
CAR TOP CARRIER
Filed May 24, 1962 4 Sheets-Sheet 1
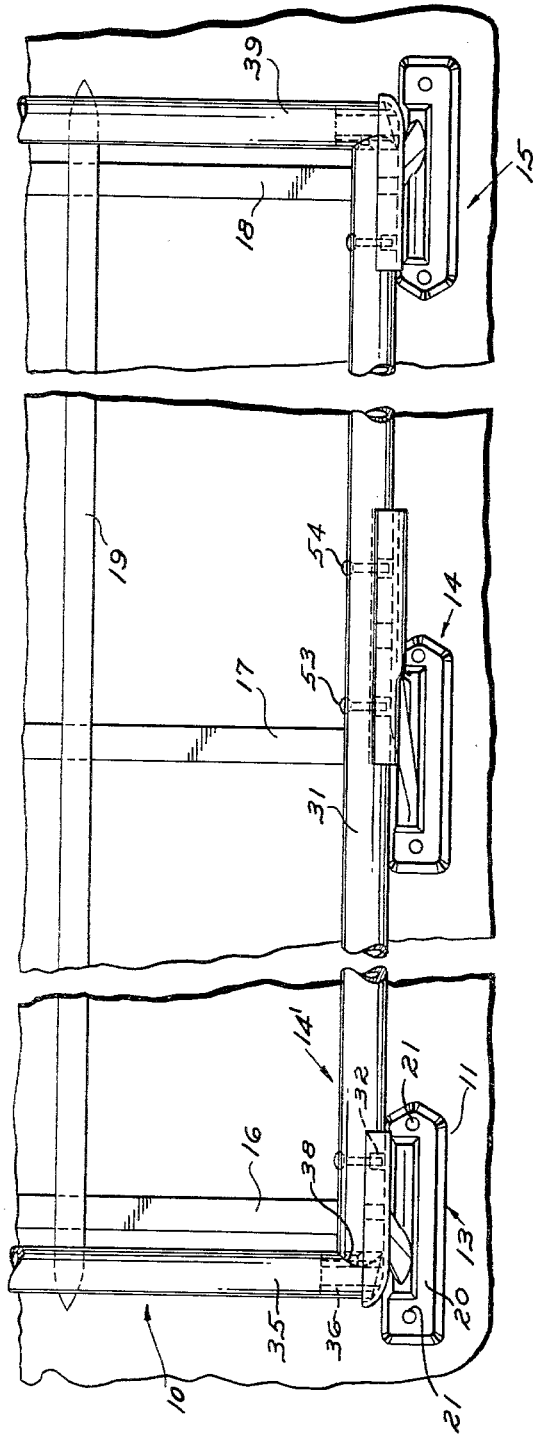
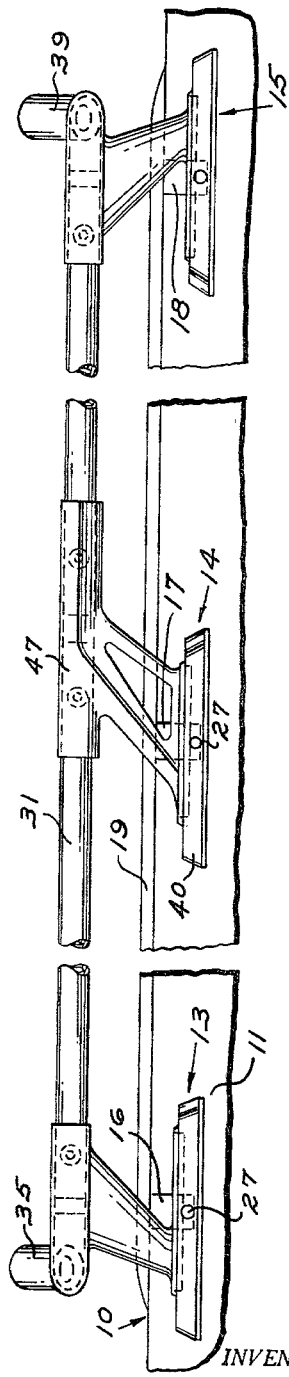
INVENTOR.
FREDERICK A. HELM
BY
ATTORNEYS

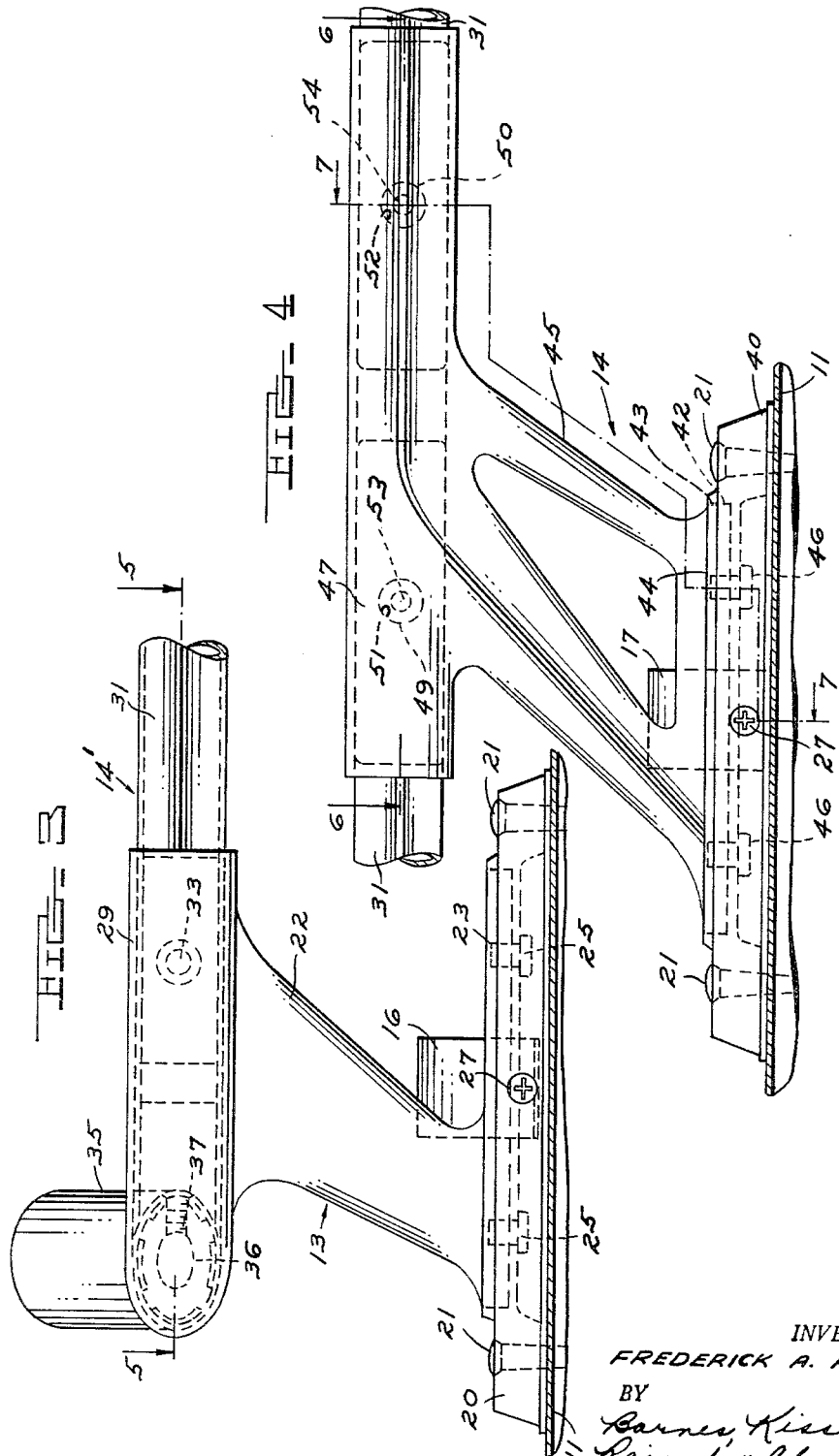

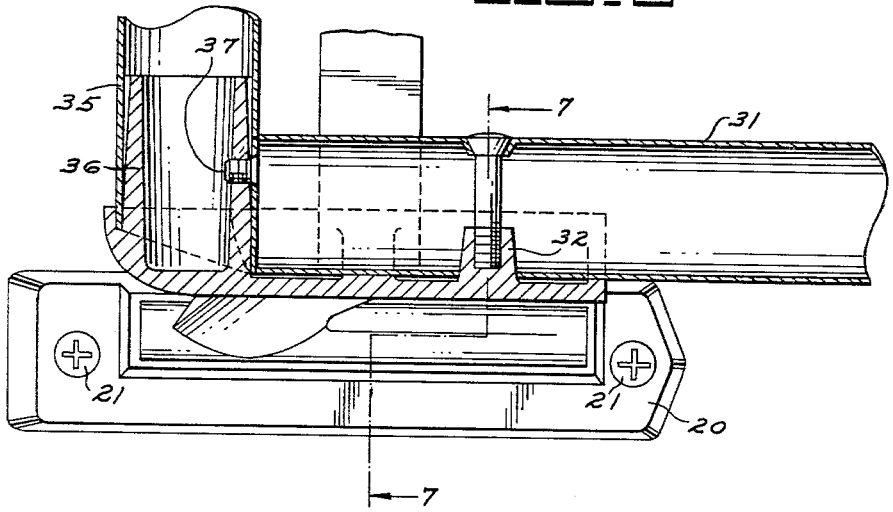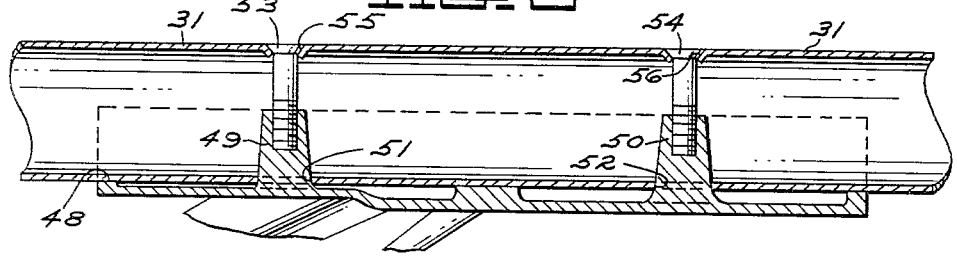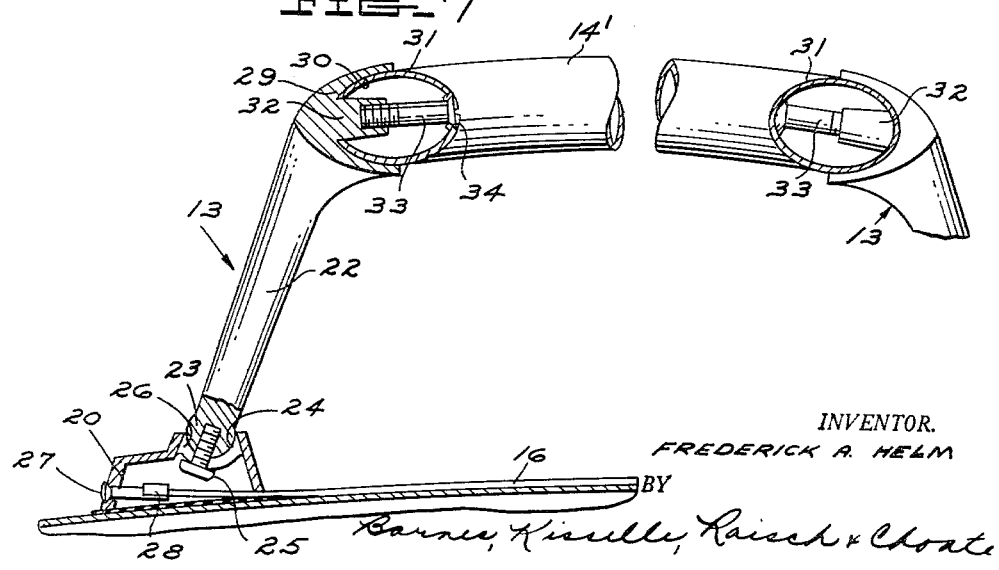

Dec. 14, 1965    F. A. HELM    3,223,301
CAR TOP CARRIER
Filed May 24, 1962    4 Sheets-Sheet 4
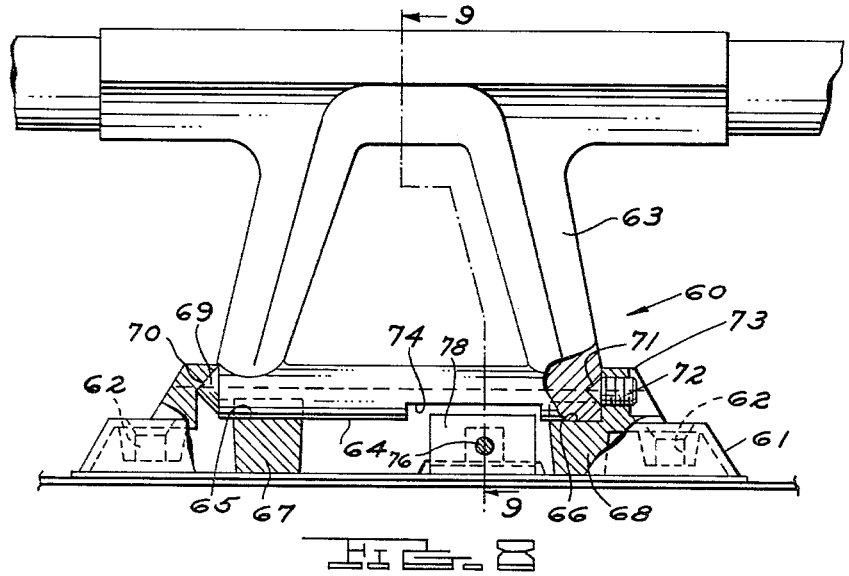
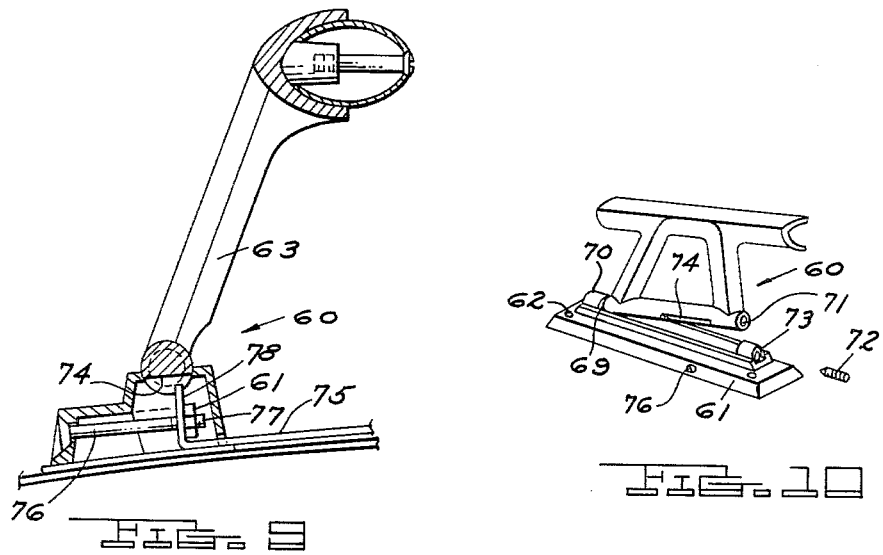
INVENTOR.
FREDERICK A. HELM
BY
ATTORNEYS United States Patent Office 3,223,301
Patented Dec. 14, 1965

3,223,301
CAR TOP CARRIER
Frederick A. Helm, Detroit, Mich., assignor to Helm Accessories, Inc., Detroit, Mich., a corporation of Michigan
Filed May 24, 1962, Ser. No. 197,403
12 Claims. (Cl. 224—42.1)

This invention relates to car top carriers that are adapted to be placed on the top or roof of an automobile.

Conventional car top carriers that are applied to the top or roof of an automobile and the like constitute stanchions that are supported at spaced points on the car top and have tubular openings in the upper ends thereof through which cylindrical side rails extend and are supported. Such carriers are usually assembled at the factory, boxed and shipped to the automobile dealer or other person who applies it by fastening the stanchions to the car top. Obviously, such an arrangement results in excessive shipping costs, large storage areas and, as a result, dealers and other installers do not care particularly to handle such car top carriers.

It is an object of this invention to provide a car top carrier of the type utilizing tubular side and end rails which can be shipped to the prospective installer in disassembled form and can be readily assembled by means only of a screwdriver without any adjustments being necessary.

It is a further object of the invention to provide such a car top carrier wherein a novel stanchion structure is used that constitutes a base and a separate upright so that the same base can be used interchangeably with different uprights thus minimizing the manufacturer's inventory and tooling costs.

It is a further object of the invention to provide such a car top carrier which utilizes a novel stanchion that constitutes a base and an upright that is angularly adjustable relative to the base so that the same stanchion can be used on the tops of vehicles having different curvatures.

It is a further object of the invention to provide such a car top carrier which has a substantially low profile as contrasted to prior art car top carriers.

In the drawings:

FIG. 1 is a fragmentary plan view of a car top carrier embodying the invention in position on a top of an automobile.

FIG. 2 is a fragmentary side elevation of the car top carrier shown in FIG. 1.

FIG. 3 is a fragmentary view on an enlarged scale of the left-hand portion of the carrier shown in FIG. 2.

FIG. 4 is a fragmentary elevational view on an enlarged scale of the central portion of the carrier shown in FIG. 2.

FIG. 5 is a fragmentary sectional view taken along the line 5—5 in FIG. 3.

FIG. 6 is a fragmentary sectional view taken along the line 6—6 in FIG. 4.

FIG. 7 is a fragmentary sectional view taken along the line 7—7 in FIG. 4.

FIG. 8 is a part sectional fragmentary side elevation of a portion of the carrier showing a modified stanchion.

FIG. 9 is a fragmentary sectional view taken along the line 9—9 in FIG. 8.

FIG. 10 is an exploded perspective view of the stanchion shown in FIGS. 8 and 9 showing the manner of assembly.

Referring to FIGS. 1 and 2, car top carrier 10 embodying the invention is adapted to be applied to a car top 11 of an automobile. Such car tops conventionally have a substantial curvature in the transverse direction.

Car top carrier 10 comprises a plurality of stanchions 13, 14 and 15 fixed at longitudinally spaced points along each side of the car top 11 and supporting a tubular frame 14' in spaced relation to the car top 11. Stanchions 13 and 15 are substantially identical except that they are complementary in configuration.

As shown in FIG. 1, transverse strips 16 extend between opposed stanchions 13, a transverse strip 17 extends between opposed stanchions 14 and a transverse strip 18 extends between opposed stanchions 15. Strips 16, 17 and 18 are fastened to the respective stanchions in a manner presently described. Longitudinally extending strips 19 are provided at transversely spaced points along the strips 16, 17 and 18 and are fastened thereto in a suitable manner as by screws or wire clips.

Referring to FIGS. 3, 5 and 7, stanchion 13 comprises a base 20 that has a length several times its width and a width several times its thickness. Base 20 is adapted to be mounted on the car top 11 by screws 21 extending through openings in the ends thereof and threaded into the car top 11. Stanchion 13 also includes an upright 22. The lower end 23 of the upright 22 has a cylindrical surface and is received in a cylindrical seat 24 formed in the upper surface of the base 20 (FIG. 7). The upright 22 is adjustably positioned angularly of a longitudinal axis of the base 20 and locked thereto by screws 25 that extend through transverse arcuate slots 26 and are threaded into the lower end 23 of the stanchion. Preferably two screws 25 are provided at longitudinally spaced points along the lower end 23 of the upright 22. As further shown in FIG. 7, transverse strip 16 is fastened to the base 20 by means of a bolt 27 that is threaded into a member 28 fixed to the end of the strip 16. The strip 16 extends beneath the base as shown in FIG. 7.

The upper end of upright 22 is enlarged as at 29 and formed with an arcuate seat 30 that is adapted to receive elliptical or oval side rail 31 of the frame 14' with the major axis of the oval cross section extending horizontally. As shown in FIG. 3, the upper end 29 of upright 22 has a length several times the largest cross sectional diameter of the side rail 31. The lower end 23 of upright 22 has a length several times the width of the base 20 (FIG. 6).

In order to fasten the side rail 31 to the stanchion, the upper end 9 of the upright 22 is formed with an integral boss 32 in the base of the arcuate seat 30 (FIG. 5). The boss 32 extends along the major axis of the oval side rail 31. A screw 33 extends through an opening 34 in the side rail 31 and is threaded into the boss 32 to fasten the end of the side rail 31 to the upright 22.

The end rail 35 of the tubular frame 14 is also received in the upper end 29 of the upright 22. As shown in FIGS. 3 and 5 the upper portion 29 of upright 22 is formed with an integral tubular extension 36 that extends into the end rail 35 and engages the inner surface thereof. A screw 37 is threaded transversely through an opening in the end rail 35 into the extension 36. As further shown in FIG. 1, the end 38 of side rail 31 is cut away to abut and conform to the outer curvature of the end rail 35. In this manner, the side and end rails are fastened to the stanchion 13.

The stanchion 15 is similar in design to that of stanchion 13 and supports the other end of the side rail 31 and the one end of the other end rail 39 in the same manner.

Intermediate stanchion 14 is similar in mechanical design to stanchions 13 and 15. As shown in FIGS. 4 and 6, stanchion 14 comprises a base 40, identical to base 20, that has a length several times its width and a width several times its height. Base 40 is formed with a cylindrical longitudinally extending seat 42 that receives the cylindrical surface 43 of the lower end 44 of upright 45. The angular position of the upright 45 relative to the base is adjusted and locked by screws 46 in the same manner as stanchion 13. The upper end 47 of upright 44 is formed with an arcuate seat 48 that is adapted to receive the side rail 31. Integral bosses 49, 50 along the base of the seat extend into openings 51, 52 in the side rail 31. Screws 53, 54 extend through openings 55, 56, respectively, in side rail 31 and are threaded into the bosses 49, 50.

By the above arrangement, the same base can be used in each of the stanchions, the uprights being changed to provide either an end upright 22 or an intermediate upright 45 as the case may be. As a result, it is only necessary for the manufacturer to make and stock one type of base which can be used with a plurality of uprights.

When the car top carrier parts are made, the uprights are fastened to the bases and the angular relationship thereof is so adjusted as to accommodate a particular automobile. The various parts are packaged and mailed to the installer. When the installer wishes to install the carrier on a car top, he assembles the side and end rails to the stanchions. He then assembles the strip 19 to the strips 16, 17, 18 and then places the assembled car top carrier on the car top over the assembled strips and fastens the bases of the stanchions to the car top and the ends of the strips 16, 17, 18 to the stanchions. The entire process can be performed by inexperienced personnel without the use of complicated tools.

When the carrier is applied to a car top, the oval or elliptical cross section of the side rails 31 and their corresponding seats 30 or 40, with the major axis of the cross section extending horizontally, provides a substantial rigidity between the stanchions and the frame 14'. Moreover, when a load is applied to the side rail on one side of the vehicle, the load is transmitted through the frame 14' to the stanchions on the other side of the vehicle because of the inability of the side rails 31 to rotate in their seats. As a result, a much more stable and rigid construction is obtained.

In the event that an installer wishes to install a car top carrier on a different vehicle from that for which the uprights have been angularly adjusted, he can readily change the angular relation of the uprights to the bases to accommodate a different vehicle.

A modified form of stanchion is shown in FIGS. 8–10. Although the stanchion shown is that corresponding to the central stanchion 14 in FIGS. 1 and 2, it can be readily understood that the arrangement can be adapted to the end stanchions 13 and 15.

As shown in FIGS. 8, 9 and 10, stanchion 60 comprises a base 61 that has a length several times its width and a width several times its thickness. Base 61 is adapted to be mounted on the car top by screws extending through openings 62. Stanchion 60 also includes an upright 63 the lower end of which is formed with a cylindrical surface 64 that engages complementary surfaces 65, 66 in spaced portions 67, 68, respectively, of the base 61. The lower end of the upright 63 is formed at one end with a conical projection 69 that engages a complementary surface 70 on the base 61. At its other end, the lower end of the upright 63 is formed with a conical seat 71 that is adapted to be engaged by a screw 72 threaded into the base 61.

The upright 63 is mounted on a base 61 by first engaging the projection 69 in the seat 70 as shown in FIG. 10 and then swinging the upright 63 to bring the cylindrical surface 64 into engagement with the surfaces 65, 66. Screw 72 is then threaded into the base 61 to engage the surface 71 and lock the upright 63 in desired adjusted angular position relative to the base 61.

The spacing between the surfaces 70 and the upright 73 on the support 61 is such that the projection 69 must be first engaged with the surface 70 and the upright 63 then swung downwardly to bring the cylindrical surface 64 into contact with the surfaces 65, 66. When all of the uprights are in position and the frame rails are fixed to the uprights, the uprights cannot be removed by vertical movement even though the screws 72 are removed.

As shown in FIG. 8, a portion of the lower cylindrical surface 64 of the upright 63 is cut away as at 74 to provide clearance for fastening the cross strap 75 on the stanchion. As shown in FIG. 9, a bolt 76 extends transversely through the base and is threaded with a nut 77 welded to a bent up flange 78 on the cross strap 75.

A feature of the carrier is that by changing the inclination of the stanchions, the length of the carrier may be changed. Thus, as shown in FIG. 2, the stanchions extend upwardly and inwardly from the ends of the carrier. If the uprights on the stanchions were replaced by uprights which extend outwardly, then the overall length of the carrier would be increased without increasing the distance between the bases.

It can thus be seen that there has been provided a car top carrier which substantially lessens the number of parts which must be manufactured and stocked by the manufacturer; which utilizes a novel stanchion that comprises a common base and a plurality of different upright members; which utilizes a novel stanchion wherein the upright is angularly adjustable relative to the base; which car top carrier can be readily applied by inexperienced personnel without the use of complicated tools; and wherein a substantially low silhouette is applied to the carrier.

I claim:

1. In a car top carrier, the combination comprising a plurality of stanchions adapted to be mounted on a car top at longitudinally spaced points along the sides thereof, each said stanchion having a base and an upright extending upwardly from said base, the upper end of each said upright including an arcuate open sided seat extending longitudinally of said stanchion and facing inwardly, a hollow tubular side rail positioned along each side of said car top and engaging the seats of successive stanchions, a hollow tubular end rail at each end of the carrier engaging and extending between the ends of said side rails.

2. In a car top carrier, the combination comprising a plurality of stanchions adapted to be mounted on a car top at longitudinally spaced points along the sides thereof, each said stanchion having a base and an upright extending upwardly from said base, the upper end of each said upright including an arcuate seat extending longitudinally of said stanchion and facing inwardly, a hollow tubular side rail having an oval cross section positioned along each side of said car top and engaging the seats of successive stanchions with the major axis of said oval cross section extending generally horizontally, said seats having complementary configurations to said side rails, a hollow tubular end rail at each end of the carrier engaging and extending between the ends of said side rails, transverse members extending between opposed stanchions and having their ends fastened thereto, and a plurality of longitudinally extending members fixed to said transverse members extending along the car top.

3. In a car top carrier, the combination comprising a plurality of stanchions adapted to be mounted on a car top at longitudinally spaced points along the sides thereof, each said stanchion having a base and an upright extending upwardly from said base, the upper end of each said upright including an arcuate seat extending longitudinally of said stanchion and facing inwardly, a hollow tubular side rail having an oval cross section positioned along each side of said car top and engaging the seats of successive stanchions with the major axis of said cross section extending generally horizontally, said seats having complementary configurations to said side rails, and a hollow tubular end rail at each end of the carrier engaging and extending between the ends of said side rails, each said upright being angularly adjustable relative to its respective base about a longitudinal axis, said base having an arcuate seat extending longitudinally on said base and facing upwardly, the lower end of said upright having a corresponding arcuate surface.

4. The combination set forth in claim 3 wherein said means for locking said upright comprises an arcuate slot in the arcuate seat of said base, a screw extending through said slot and threaded into said upright.

5. The combination set forth in claim 4 wherein the curvature of said arcuate seat and the arcuate section of the lower end of the upright is cylindrical.

6. In a car top carrier, the combination comprising a plurality of stanchions adapted to be mounted on a car top at longitudinally spaced points along the sides thereof, each said stanchion having a base and an upright extending upwardly from said base, the upper end of each of said upright including an arcuate seat extending longitudinally of said stanchion and facing inwardly, a hollow tubular side rail having an oval cross section positioned along each side of said car top and engaging the seats of successive stanchions with the major axis of said cross section extending generally horizontally, said seats having complementary configurations to said side rails, and a hollow tubular end rail at each end of the carrier engaging and extending between the ends of said side rails, each said upright being angularly adjustable relative to its respective base about a longitudinal axis, means for locking said upright in angularly adjusted position relative to said base comprising an arcuate seat extending longitudianlly on said base and facing inwardly, the lower end of said upright having a corresponding arcuate surface, and means for locking said upright relative to said base, said means for locking said upright comprising a projection at one longitudinal end of the lower portion of said upright, a seat on said base adapted to be engaged by said projection, and a screw threaded into the base adjacent the other end of the lower end of the upright and adapted to engage the other end of the lower end of the upright to lock the upright in angular position relative to the base.

7. In a car top carrier, the combination comprising a stanchion adapted to be mounted on a car top at longitudinally spaced points along the sides thereof, said stanchion having a base and an upright extending upwardly from said base, the upper end of each said upright including an arcuate open sided seat extending longitudinally of said stanchion and facing inwardly, and a hollow tubular side rail having an oval cross section positioned along each side of said car top and engaging the seat of said stanchion with the major axis of the oval cross section extending generally horizontally, each said upright being angularly adjustable relative to its respective base about a longitudinal axis, and means for locking said upright comprising a projection at one longitudinal end of the lower portion of said upright, a seat on said base adapted to be engaged by said projection, and a screw threaded into the base adjacent the other end of the lower end of the upright and adapted to engage the other end of the lower end of the upright to lock the upright in angular position relative to the base.

8. The combination set forth in claim 7 including a conical seat on the other end of the lower portion of the upright, said screw having a complementary conical projection for engaging said conical seat.

9. In a car top carrier, the combination comprising a plurality of stanchions adapted to be mounted on a car top at longitudinally spaced points along the sides thereof, each said stanchion having a base and an upright extending upwardly from said base, the upper end of each said upright including an arcuate open sided seat extending longitudinally of said stanchion and facing inwardly, a hollow tubular side rail positioned along each side of said car top and engaging the seats of successive stanchions, and a hollow tubular end rail at each end of the carrier engaging and extending between the ends of said side rails, each said upright being angularly adjustable relative to its respective base about a longitudinal axis, each said side rail having a non-circular configuration, the respective seats of the upper ends of the uprights having a corresponding configuration.

10. In a car top carrier, the combination comprising a stanchion adapted to be mounted on a car top at longitudinally spaced points along the sides thereof, said stanchion having a base and an upright extending upwardly from said base, the upper end of each said upright including an arcuate open sided seat extending longitudinally of said stanchion and facing inwardly, and a hollow tubular side rail having an oval cross section positioned along each side of said car top and engaging the seat of said stanchion with the major axis of the oval cross section extending generally horizontally, each said upright being angularly adjustable relative to its respective base about a longitudinal axis, said base having a cylindrical seat extending longitudinally in said base, the lower end of said upright having a corresponding cylindrical surface.

11. In a car top carrier, the combination comprising a stanchion for carrier rails adapted to be mounted on a car top, said stanchion comprising a base and an upright extending upwardly from said base, said base having a seat into which the lower end of each said upright extends, means movable longitudinally of said base for locking the lower end of each said upright with respect to said seat, said means being such that the upright can only be removed relative to the base by an arcuate movement about a transverse axis when said locking means is moved to unlocked position.

12. The combination set forth in claim 11 wherein said means for locking each said stanchion comprises a depression in said base at one end of the stanchion, a projection on the upright adapted to extend into said depression, and a locking member adapted to be moved into engagement with the other end of the upright.

References Cited by the Examiner

UNITED STATES PATENTS

| 1,709,898 | 4/1929 | Cunneen | 248—70 |
| 1,861,366 | 5/1932 | Sherwood | 248—226.1 X |
| 2,357,203 | 8/1944 | Jimmes. | |
| 2,919,841 | 1/1960 | Helm. | |
| 2,955,790 | 10/1960 | Sylvester | 248—65 |
| 3,120,914 | 2/1964 | Smith. | |

FOREIGN PATENTS

| 171,229 | 5/1952 | Austria. |
| 1,026,286 | 2/1953 | France. |
| 452,150 | 10/1949 | Italy. |
| 458,600 | 7/1950 | Italy. |

GERALD M. FORLENZA, *Primary Examiner.*

HUGO O. SCHULZ, MORRIS TEMIN, *Examiners.*